(12) United States Patent
Cox et al.

(10) Patent No.: US 10,305,263 B2
(45) Date of Patent: May 28, 2019

(54) ELECTRICAL POWER SUPPLY STRUCTURES

(71) Applicant: Superior Tray Systems Inc., Surrey (CA)

(72) Inventors: Martin Cox, Surrey (CA); Parry Singh Mudhar, Vancouver (CA); Tuan Anh Nguyen, Vancouver (CA); Vladislav Leder, Richmond (CA)

(73) Assignee: SUPERIOR TRAY SYSTEMS INC., Delta (CA)

( * ) Notice: Subject to any disclaimer, the term of this patent is extended or adjusted under 35 U.S.C. 154(b) by 0 days.

(21) Appl. No.: 15/847,046

(22) Filed: Dec. 19, 2017

(65) Prior Publication Data

US 2018/0323586 A1  Nov. 8, 2018

(30) Foreign Application Priority Data

May 2, 2017 (CA) ..................................... 2965823

(51) Int. Cl.
*H02G 3/08* (2006.01)
*H02B 1/20* (2006.01)
(Continued)

(52) U.S. Cl.
CPC ................. *H02B 1/20* (2013.01); *E04B 5/48* (2013.01); *H01B 9/02* (2013.01); *H02B 1/46* (2013.01);
(Continued)

(58) Field of Classification Search
CPC . H02B 1/20; H02B 1/46; H02B 1/305; H02B 1/202; H02B 1/205; H02B 1/26;
(Continued)

(56) References Cited

U.S. PATENT DOCUMENTS

| 4,291,195 A * | 9/1981 | Blomqvist | ................ H02G 3/22 174/505 |
| 4,376,230 A * | 3/1983 | Bargsten | .................. H02G 3/22 248/56 |

(Continued)

FOREIGN PATENT DOCUMENTS

| WO | 9953584 A1 | 10/1999 |
| WO | 2006076746 A1 | 7/2006 |

(Continued)

*Primary Examiner* — Angel R Estrada
(74) *Attorney, Agent, or Firm* — Norton Rose Fulbright Canada LLP

(57) ABSTRACT

The present disclosure provides an electrical power supply structure comprising a plurality of conductors, each conductor extending longitudinally and configured to carry high amperage electrical power, a barrier support plate comprising one or more openings for receiving the plurality of conductors, and a sealing system forming a water tight seal around the plurality of conductors in the openings, a first support structure extending longitudinally from a first side of the barrier support plate, the first support structure connected to the barrier support plate by a first flexible joint, and a second support structure extending longitudinally from a second side of the barrier support plate, the second support structure connected to the barrier support plate by a second flexible joint. Each of the first and second support structures comprises a longitudinally extending enclosure having a plurality of transversely extending conductor support members for supporting the plurality of conductors.

10 Claims, 9 Drawing Sheets

(51) Int. Cl.
*E04B 5/48* (2006.01)
*H01B 9/02* (2006.01)
*H02B 1/46* (2006.01)
*H02G 3/04* (2006.01)
*H02G 3/22* (2006.01)
*H02G 3/34* (2006.01)
*H02B 1/30* (2006.01)
*H02G 3/32* (2006.01)
*H02G 5/06* (2006.01)
*H02G 5/08* (2006.01)

(52) U.S. Cl.
CPC .............. *H02G 3/0431* (2013.01); *H02G 3/22* (2013.01); *H02G 3/34* (2013.01); *H02B 1/305* (2013.01); *H02G 3/0412* (2013.01); *H02G 3/0456* (2013.01); *H02G 3/32* (2013.01); *H02G 5/06* (2013.01); *H02G 5/08* (2013.01)

(58) Field of Classification Search
CPC .......... H01B 9/02; H01B 9/00; H02G 3/0431; H02G 3/22; H02G 3/34; H02G 3/0412; H02G 3/0456; H02G 3/32; H02G 5/06; H02G 3/08; H02G 3/081
USPC .......... 174/50, 68.1, 68.3, 72 A, 135, 149 R, 174/149 B; 248/56, 68.1, 74.1, 74.2; 385/134, 135; 52/220.1, 220.3, 220.7, 52/220.8; 312/223.1, 223.2, 223.6
See application file for complete search history.

(56) References Cited

U.S. PATENT DOCUMENTS

| | | | | |
|---|---|---|---|---|
| 4,702,444 | A | * | 10/1987 | Beele ................... H02G 3/22 174/151 |
| 4,767,086 | A | * | 8/1988 | Blomqvist ............. H02G 3/22 248/56 |
| 5,391,840 | A | | 2/1995 | Hughes et al. |
| 5,665,939 | A | | 9/1997 | Jorgensen et al. |
| 5,992,802 | A | * | 11/1999 | Campbell ............... H02G 3/30 248/68.1 |
| 6,590,154 | B1 | | 7/2003 | Badey et al. |
| 6,706,969 | B1 | * | 3/2004 | Young ................... H02G 3/30 248/68.1 |
| 7,477,500 | B2 | | 1/2009 | Schmidt et al. |
| RE42,266 | E | | 4/2011 | Sparrowhawk |
| 8,193,448 | B2 | * | 6/2012 | Syed ................... H05K 7/1491 174/68.1 |
| 8,294,030 | B2 | * | 10/2012 | Pollard, Jr. ............. H02G 3/30 174/650 |
| 9,059,575 | B2 | | 6/2015 | Pawluk |
| 2015/0255967 | A1 | | 9/2015 | Pawluk |
| 2016/0050782 | A1 | | 2/2016 | Englert et al. |

FOREIGN PATENT DOCUMENTS

| | | |
|---|---|---|
| WO | 2006097600 A1 | 9/2006 |
| WO | 2007006961 A1 | 1/2007 |
| WO | 2011146567 A2 | 11/2011 |
| WO | 2013142874 A1 | 9/2013 |

* cited by examiner

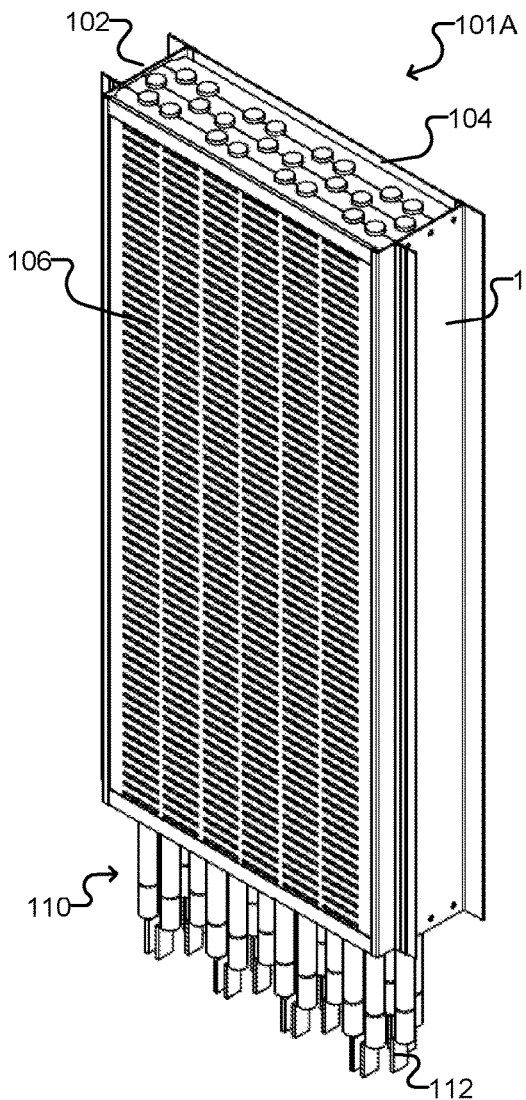
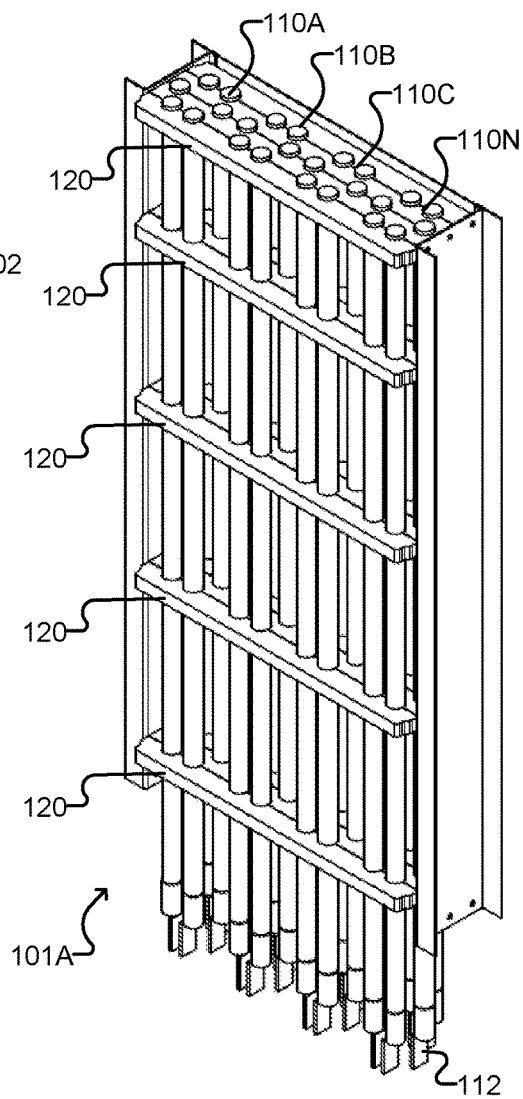
FIG. 3     FIG. 3A
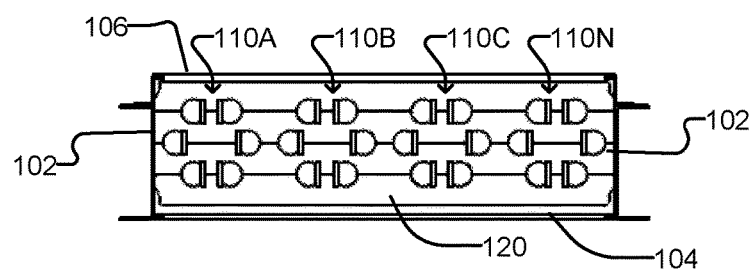
FIG. 3B

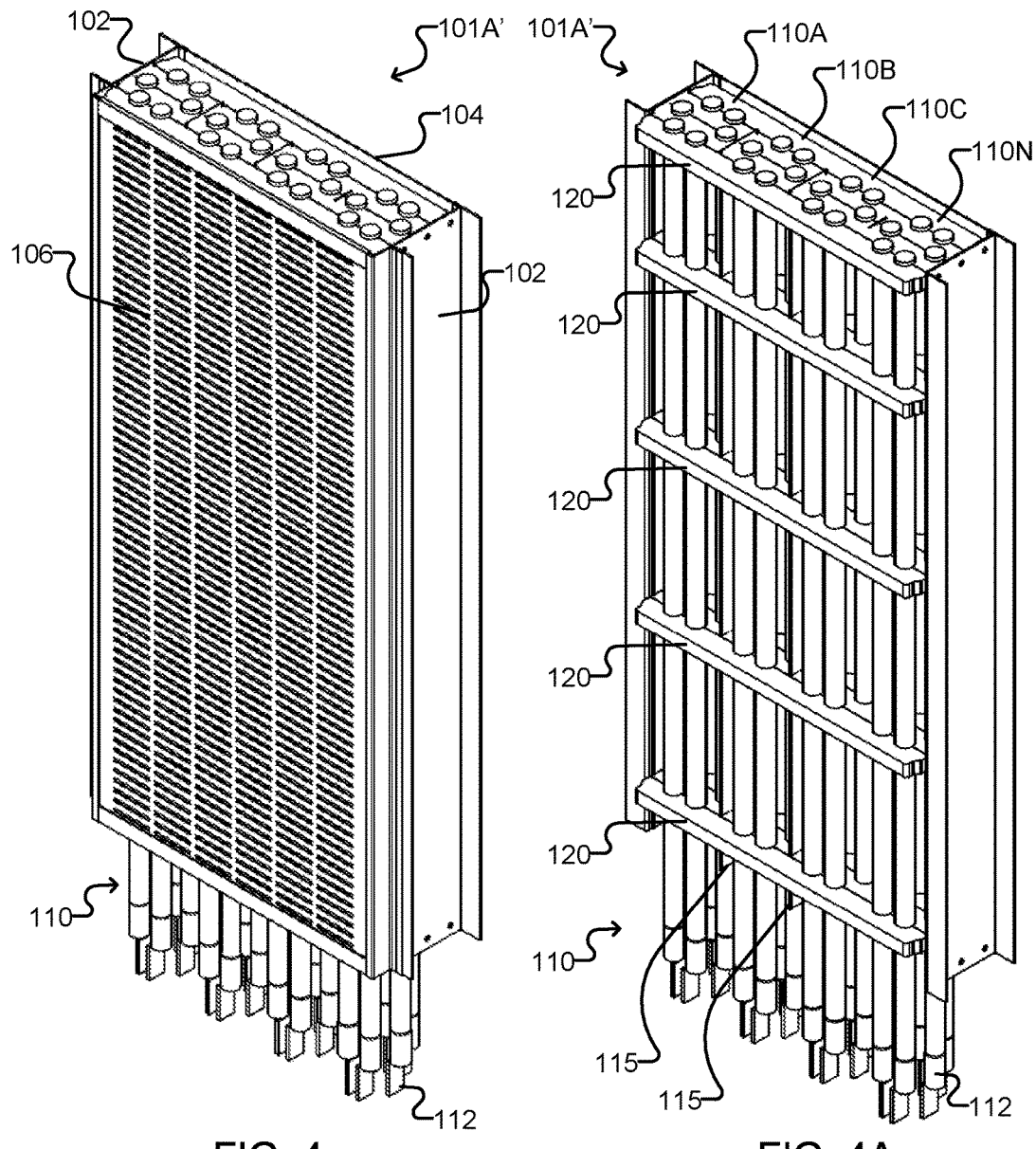
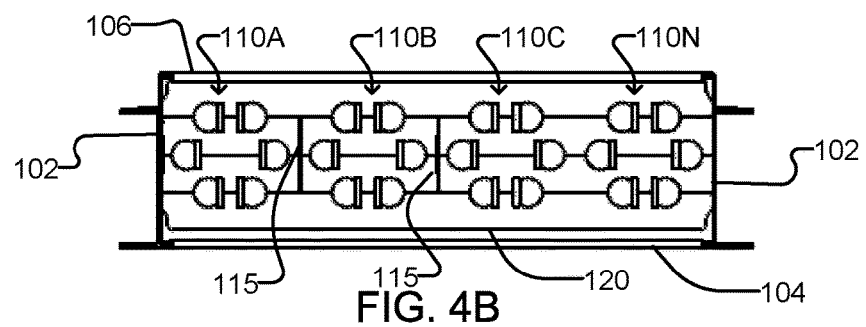
FIG. 4    FIG. 4A
FIG. 4B

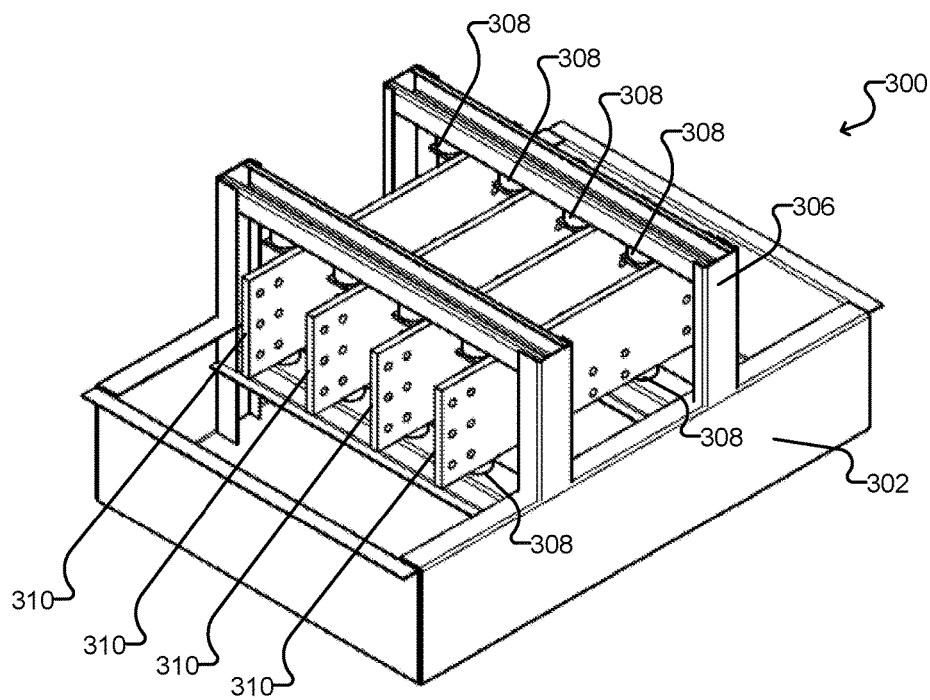
FIG. 6A
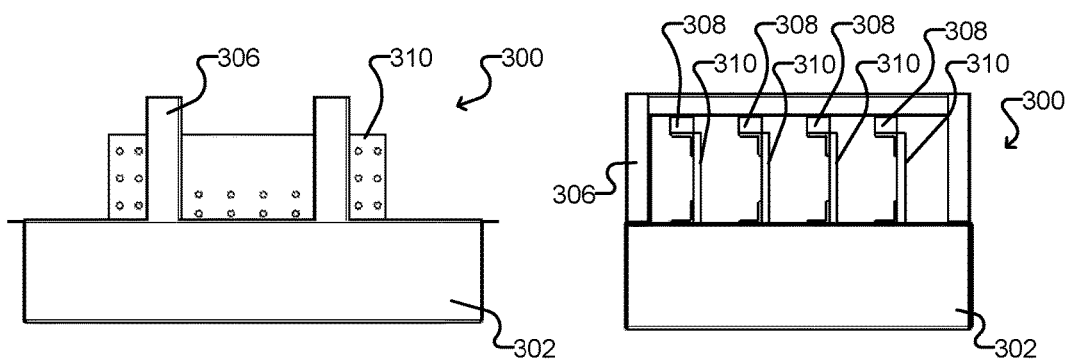
FIG. 6B
FIG. 6C

ELECTRICAL POWER SUPPLY STRUCTURES

CROSS REFERENCE TO RELATED APPLICATION

This application claims the benefit of priority of Canadian Patent Application No. 2,965,823 filed on May 2, 2017, which is hereby incorporated herein by reference in its entirety.

TECHNICAL FIELD

The present disclosure relates to distribution of electrical power within multi-story buildings.

BACKGROUND

In multi-story structures such as office towers, condominiums, apartments, and other buildings, electrical power is typically distributed with the use of bus ducts which run vertically through multiple floors of the building. At various points along a vertical bus duct, connection points such as bus plugs are needed to tie in cables that distribute power throughout each floor. Depending on power requirements, construction details, and other factors at play in a building a bus duct may have connection points on every floor, every other floor, or any other desired pattern.

Existing bus ducts are typically expensive and time consuming to install and replace. A typical bus duct has a number of rigid conductors, and these conductors must be securely connected at a joint between adjacent bus duct sections, often with a blade-type connection with bolts used to squeeze the conductors together. Such joints can present relatively high resistance, and some jurisdictions require that the bolts in the joints of a bus duct be re-torqued every six months. Further, due to seismic considerations, rigid bus ducts must typically be installed with their longer lateral sides oriented perpendicularly to a structural wall, such that the area footprint required for the bus duct can be significantly larger than the cross-sectional area of the bus duct itself.

The inventors have determined a need for improved structures and systems for distribution of electrical power in multi-story buildings.

SUMMARY

One aspect provides an electrical power supply structure comprising a plurality of insulated conductors, each insulated conductor extending longitudinally and configured to carry high amperage electrical power, a barrier support plate comprising one or more openings for receiving the plurality of insulated conductors, and a sealing system forming a water tight seal around the plurality of insulated conductors in the openings, a first support structure extending longitudinally from a first side of the barrier support plate, the first support structure connected to the barrier support plate by a first flexible joint, and a second support structure extending longitudinally from a second side of the barrier support plate, the second support structure connected to the barrier support plate by a second flexible joint. Each of the first and second support structures comprises a longitudinally extending enclosure having a plurality of transversely extending conductor support members for supporting the plurality of insulated conductors.

The electrical power supply structure may comprise a spacer block having an opening sized to fit an outer dimension of one of the first and second support structures and configured to be mounted between the barrier support plate and a floor of a building such that the barrier support plate is held at a predetermined height above the floor.

The plurality of insulated conductors may be grouped by phase. The insulated conductors in each group may be arranged in a circular arrangement. The electrical power supply structure may comprise a shield plate between groups of insulated conductors of different phases.

Another aspect provides an electrical power distribution system for a high-rise building with a plurality of floors. The system comprises a plurality of electrical power supply structures of the present disclosure arranged in a vertical stack; a plurality of tap boxes for connecting the plurality of electrical supply structures, each tap box connected between two adjacent electrical power supply structures and comprising a tap bar for each phase of electrical power, the tap bar having a first end for connecting to all of the plurality of insulated conductors carrying that phase of electrical power in an upper one of the two adjacent electrical power supply structures, and a second end for connecting to all of the plurality of insulated conductors carrying that phase of electrical power in a lower one of the two adjacent electrical power supply structures. A length of each of the first and second support structures of each of the electrical power supply structures is selected such that each of the tap boxes is positioned at a predetermined height above one of the plurality of floors of the high-rise building.

Another aspect provides a cable bus for holding a plurality of high amperage electrical cables. The cable bus comprises a supporting structure extending in a longitudinal direction and defining a cable enclosure; and one or more shielding members extending within the supporting structure in the longitudinal direction and dividing the cable enclosure into two or more longitudinal chambers, and a plurality of cable support members extending in a transverse direction across the supporting structure. The plurality of cable support members are longitudinally spaced apart along a length of the supporting structure, and each cable support member comprises a plurality of cable holders arranged in a plurality of groups, each group located within one of the longitudinal chambers, such that the cable support members support electrical cables carrying multiphase electrical power and comprising a plurality of cables for each phase of electrical power, whereby each plurality of cables for each phase of electrical power are supported within a distinct longitudinal chamber.

Further aspects and details of example embodiments are set forth below.

DRAWINGS

The following figures set forth embodiments in which like reference numerals denote like parts. Embodiments are illustrated by way of example and not by way of limitation in the accompanying figures.

FIG. 3 shows a lower half of an example vertical bus section for the structure of FIG. 1.

FIG. 3A shows the structure of FIG. 3 with the cover removed.

FIG. 3B shows a bottom view of the structure of FIG. 3.

FIG. 4 shows a lower half of another example vertical bus section for the structure of FIG. 1.

FIG. 4A shows the structure of FIG. 4 with the cover removed.

FIG. 4B shows a bottom view of the structure of FIG. 4.

FIG. 6A shows the tap box of FIG. 6 with the cover removed.

FIG. 6B is a side view of the tap box of FIG. 6A.

FIG. 6C is a bottom view of the tap box of FIG. 6A.

DETAILED DESCRIPTION

Figure 1:
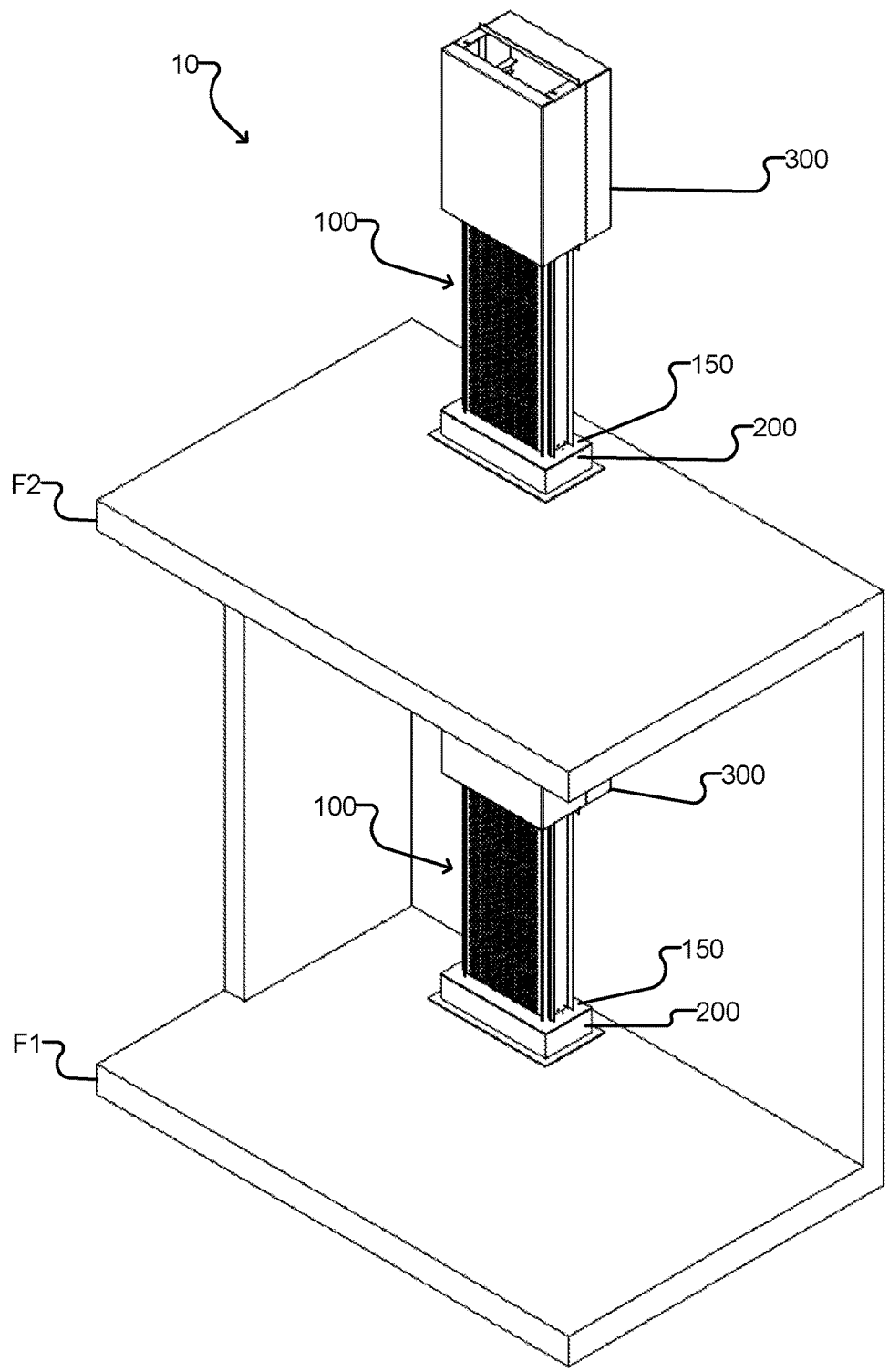
FIG. 1 shows a portion of an example electrical power supply structure installed between two floors of a building according to one embodiment of the present disclosure.

The following describes structures for supplying electrical power among multiple floors of a building. Example embodiments described below provide structures comprising vertical conductor sections and tap boxes that may be rapidly and securely connected to facilitate installation.

For simplicity and clarity of illustration, reference numerals may be repeated among the figures to indicate corresponding or analogous elements. Numerous details are set forth to provide an understanding of the examples described herein. The examples may be practiced without these details. In other instances, well-known methods, procedures, and components are not described in detail to avoid obscuring the examples described. The description is not to be considered as limited to the scope of the examples described herein.

Figures 2, 2A:
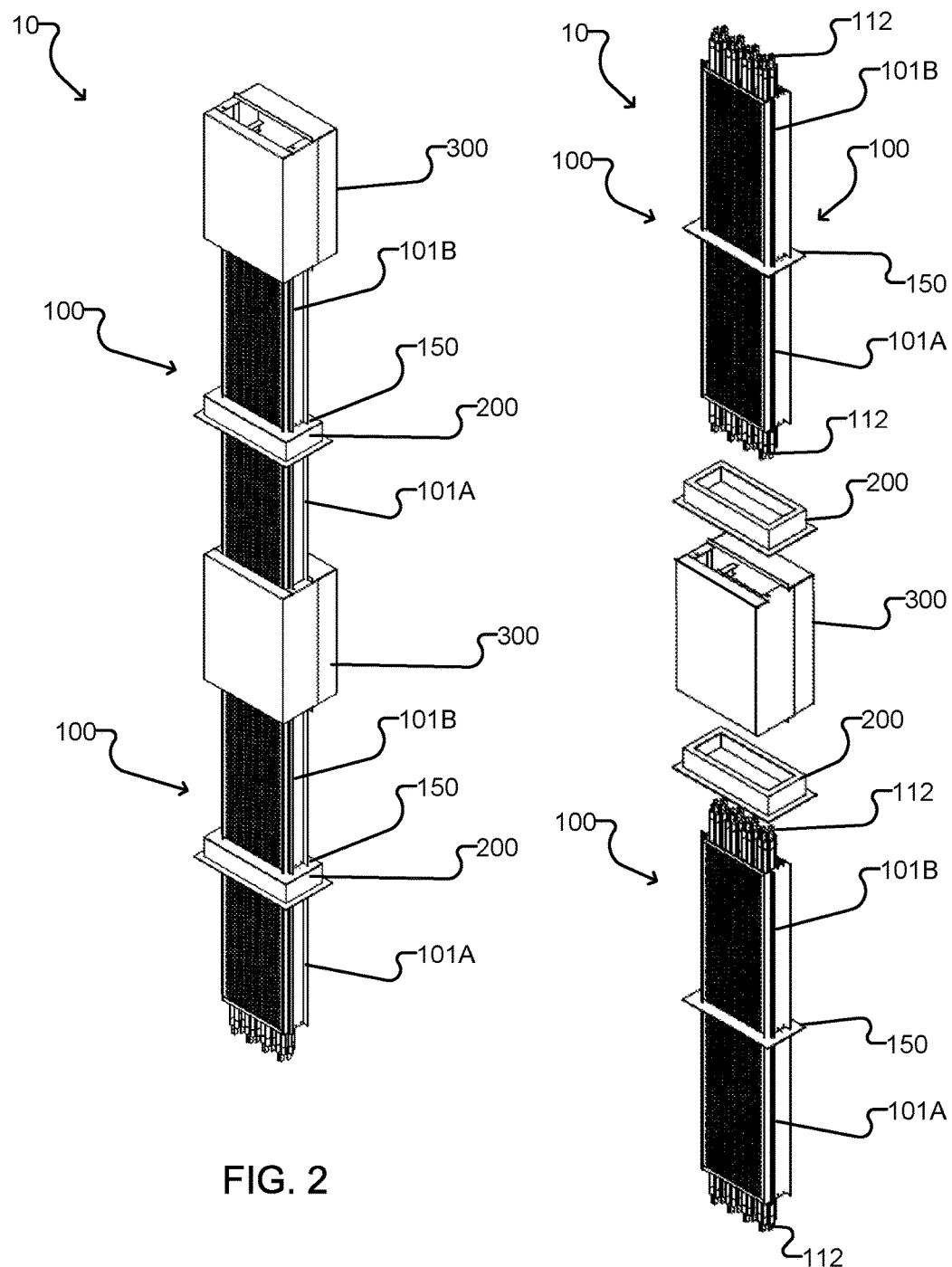
FIG. 2 shows the structure of FIG. 1 in isolation.
FIG. 2A is an exploded view of the structure of FIG. 1.

FIG. 1 shows a portion of an example electrical power supply structure 10 installed between two floors F1, F2 of a building. FIG. 2 shows the structure 10 of FIG. 1 in isolation, and FIG. 2A is a partially exploded view of the structure 10. Structure 10 comprises a vertical bus section 100 extending through a hole in each floor. Each vertical bus section 100 comprises a lower portion 101A extending below the floor, an upper portion 101B extending upward from the floor, and a barrier support plate 150 between the lower and upper portions 101A and 101B. A spacer block 200 may be provided at each floor and placed between the barrier support plate 150 and the floor to hold the barrier support plate 150 at a predetermined distance above the floor, as discussed further below with reference to FIG. 5. A tap box 300 is provided between adjacent vertical bus sections 100 to provide electrical connections between the conductors thereof, and allow cables or other conductors to connect thereto, as discussed further below with reference to FIGS. 6, 6A, 6B and 6C. In FIG. 2A, the lower one of the spacer blocks 200 is illustrated between the tap box 300 and the lower bus section 100, but it is to be understood that the spacer block 200 would be slid over the lower section of lower bus section 100 such that the barrier support plate 150 of the lower bus section 100 is atop of the spacer block 200.

FIG. 3 shows an example lower portion 101A of a vertical bus section 100 for a structure such as structure 10 of FIG. 1. The lower portion 101A comprises a support structure having pair of opposed side rails 102, a back panel 104 extending between the rails 102, and a front cover 106, which form an enclosure for a plurality of conductors 110. As seen in FIGS. 3A and 3B, the conductors are held in place within the lower portion 101A by a plurality of conductor support members 120 extending in a transverse direction between the side rails 102. The cable support members 120 are longitudinally spaced apart along the length of the lower portion 101A. The side rails 102 of each of the lower portion 101A and upper portion 101B of each bus section 100 may be connected to the barrier support plate 150 (not shown in FIGS. 3, 3A, 3B) by a flexible joint.

Figures 2B, 2C, 2D:
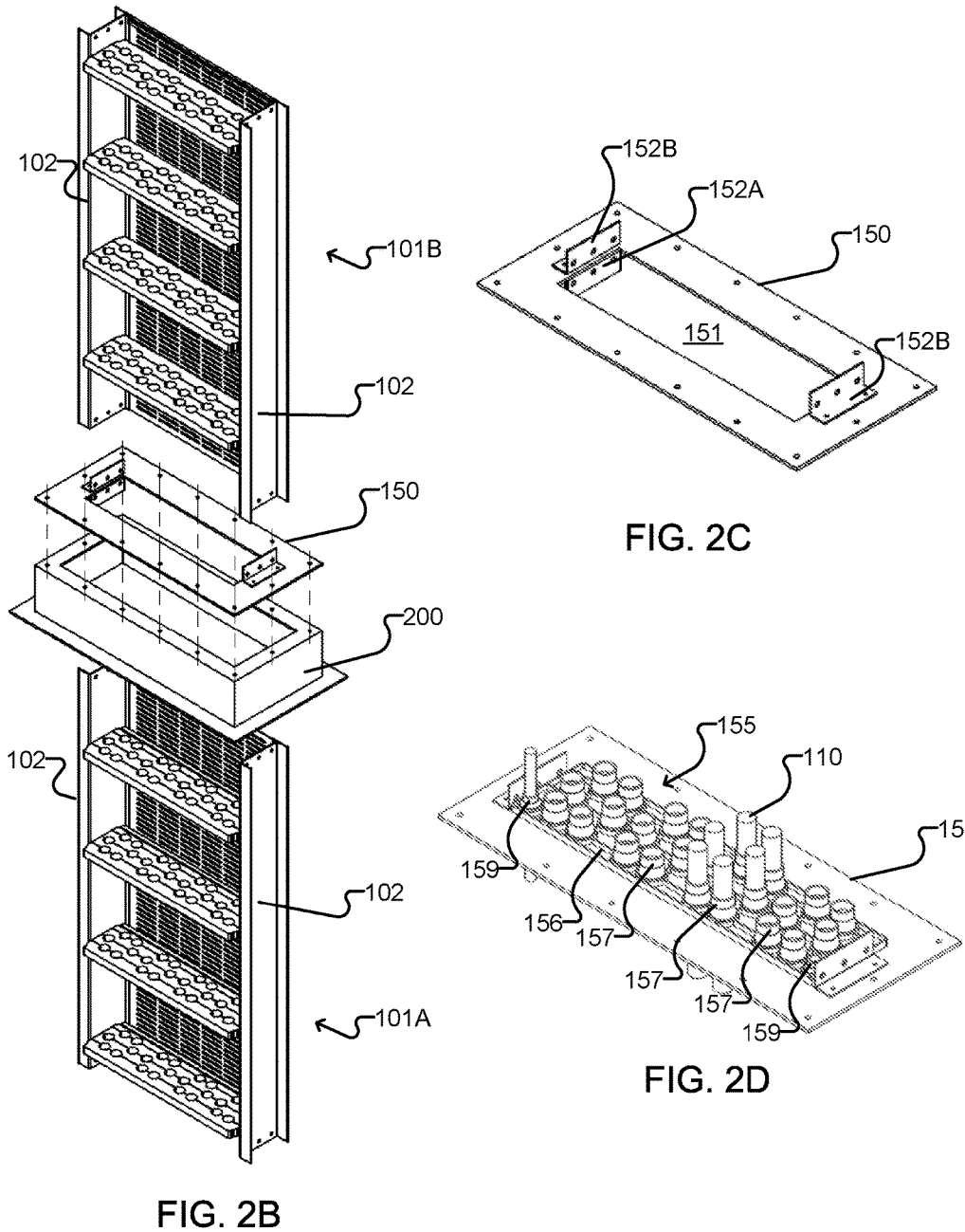
FIG. 2B shows an exploded view of one of the bus sections of the structure of FIG. 1.
FIG. 2C shows an example barrier support plate of a bus section.
FIG. 2D shows an example sealing system for a barrier support plate.

Referring to FIGS. 2B and 2C, in some embodiments the barrier support plate 150 has a central aperture 151 with a pair of lower and upper mounting brackets 152A and 152B on each lateral side of the central aperture 151. The side rails 102 of each of the lower portion 101A and upper portion 101B of each bus section 100 are bolted to the lower and upper mounting brackets 152A and 152B, to provide a degree of flexibility in the connection between side rails 102 and support plate 150.

The upper portion 101B of each bus section 100 is substantially similar to the lower portion 101A. In some embodiments the lower and upper portions 101A and 101B have the same length. In some embodiments the lower and upper portions 101A and 101B have different lengths. In some embodiments the lower and upper portions 101A and 101B are sized so that each tap box 300 is at a predetermined height above each floor. The conductors 110 extend through the length of each bus section 100, and terminate in attachment tabs 112 that are connected to bus bars 310 in the tap boxes 300 as described below.

The conductors 110 are each insulated in some embodiments. The conductors 110 may comprise flexible cables in some embodiments. The conductors 110 may comprise rigid conductors such as pipes or the like in some embodiments. Utilizing pipes for the conductors 110 can advantageously allow a bus section 110 to have a smaller number of conductors 110 for carrying the same current, and fewer support members 120, in comparison to flexible cables, which may result in reduced cost. In embodiments using rigid conductors 110 such as pipes, flexible members such as for example metal braids are provided between conductors and bus bars 310 to accommodate expansion and contraction of conductors 110.

The conductors 110 are preferably continuous throughout the whole length of a bus section 100, and extend between the lower and upper portions 101A and 101B through one or more apertures in the barrier support plate 150. A sealing system is preferably provided around the apertures through the barrier support plate 150 to provide a water tight seal around the conductors 110. FIG. 2D shows a support plate 150 with an example sealing system 155. The sealing system 155 comprises a sealing barrier 156 across the central aperture 151. The sealing barrier 156 has a plurality of holes therethough with a sealing sleeve 157 around each hole. In the FIG. 2D example, only one phase of conductors 110 is shown inserted through the holes and held within the sealing sleeves 157. The FIG. 2D example also includes smaller holes and associated sleeves 159 for receiving grounding cables (only one of which is shown). Each of the conductors 110 terminate in an attachment tab 112 at the lower end of the lower portion 101A, and another attachment tab 112 at the upper end of the upper portion 101B. In the illustrated embodiment, the conductors 110 have generally circular cross section.

In the example illustrated in FIGS. 3, 3A, 3B, the conductors 110 are configured to deliver three phase grounded electrical power, and are grouped by phase. The conductors of each group of first phase conductors 110A, second phase conductors 110B, third phase conductors 110C and neutral conductors 110N are arranged in a generally circular arrangement, as best seen in FIG. 3B. Such a circular arrangement facilitates connection of the attachment tabs 112 to the tap boxes 300, as described below. Also such a circular arrangement provides improved force cancelation between the three electrical phase groups of conductors 110 and the neutral group as opposed to other shapes.

In some embodiments, the bus sections 100 may comprise shielding. FIGS. 4, 4A and 4B show an example lower portion 101A' of a vertical bus section 100 that includes shielding. The example of FIGS. 4, 4A and 4B is otherwise the same as the example of FIGS. 3, 3A and 3B. In the illustrated example, a shield plate 115 is provided between the first phase conductors 110A and the second phase conductors 110B, and another shield plate 115 is provided between the second phase conductors 110B and the third phase conductors 110C. The shield plates 115 extend continuously throughout the lower portion 101A', through slots in the cable support members 120. As best seen in FIG. 4B, the shield plates 115 do not extend the full depth between the back panel 104 and cover 106. The shield plates 115 may be constructed from steel or aluminum in some embodiments. The thickness of the shield plates 115 may be selected based on forces and eddy currents on each electrical phase group and neutral group of conductors 110. In some embodiments, shield plates 115 have a thickness of about 0.040" (0.1 cm).

Figure 5:
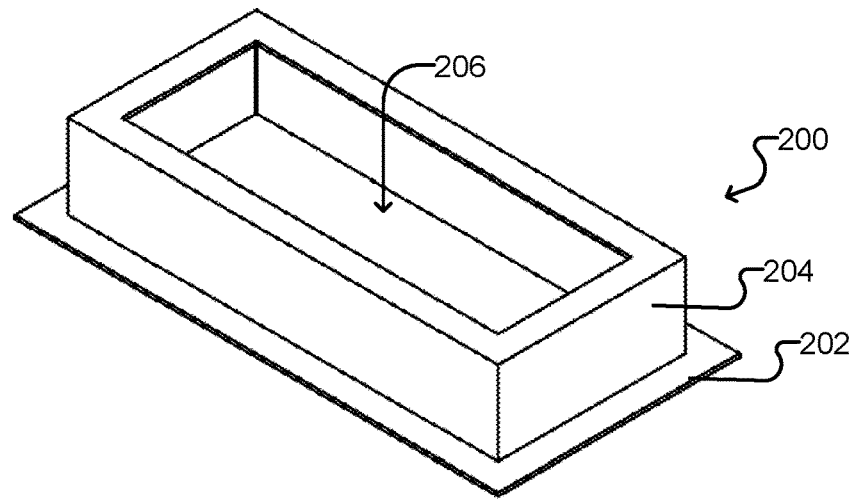
FIG. 5 shows an example spacer block for the structure of FIG. 1.

FIG. 5 shows an example spacer block 200 for a structure such as structure 10 of FIG. 1. The spacer block 200 comprises a flange 202 and a riser 204 with an aperture 206 therethrough. The aperture 206 is sized and shaped such that the lower portion 101A of a bus section 100 is snugly received therein. In some embodiments, the spacer block 200 is constructed from steel or stainless steel. In some embodiments, the spacer block 200 may have fire retarding materials therewithin.

Figure 6:
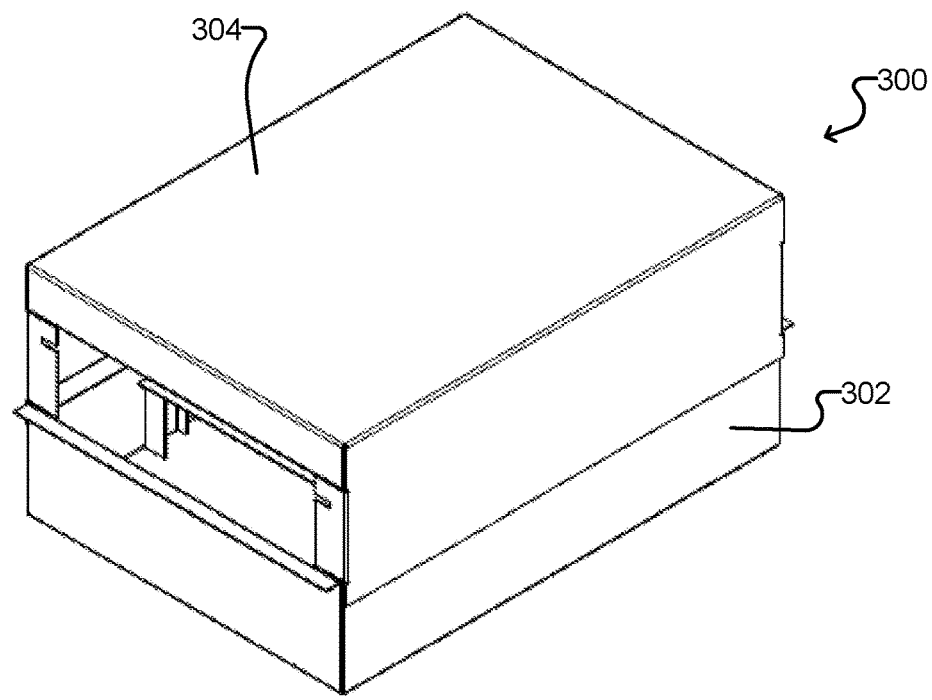
FIG. 6 shows an example tap box for the structure of FIG. 1.
Figure 6D:
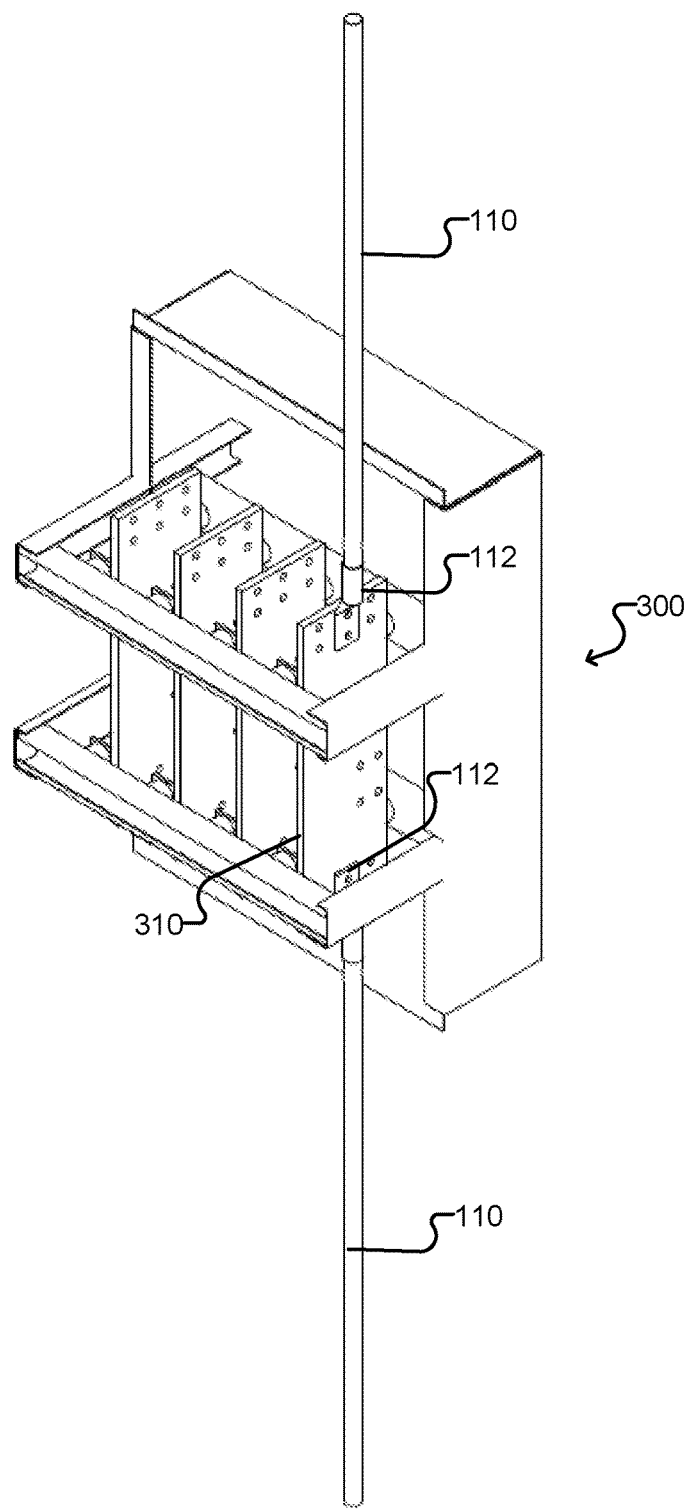
FIG. 6D shows a single conductor connected to a bus bar of a tap box.

FIG. 6 shows an example tap box 300 for a structure such as structure 10 of FIG. 1. The tap box 300 comprises a base 302 and a cover 304. An opening between the base 302 and the cover 304 is provided on each of the top and the bottom for receiving the end of a bus section 100. As seen in FIGS. 6A, 6B and 6C, support brackets 306 extend from the base 302, and bus bars 310 are attached to the support brackets 306 through insulating connectors 308. The bus bars 310 have holes at either end to facilitate connection of the attachment tabs 112 of the conductors 110 thereto. FIG. 6D shows a single conductor connected to each end of the bus bar 310 by means of an attachment tab 112. The bus bars 310 may also each have a plurality of holes therethrough to facilitate connection of cables for power distribution from the tap box 300. In some embodiment, the tap box 300 has partially cut holes or "knockouts" around the periphery of the base 302.

Figure 7:
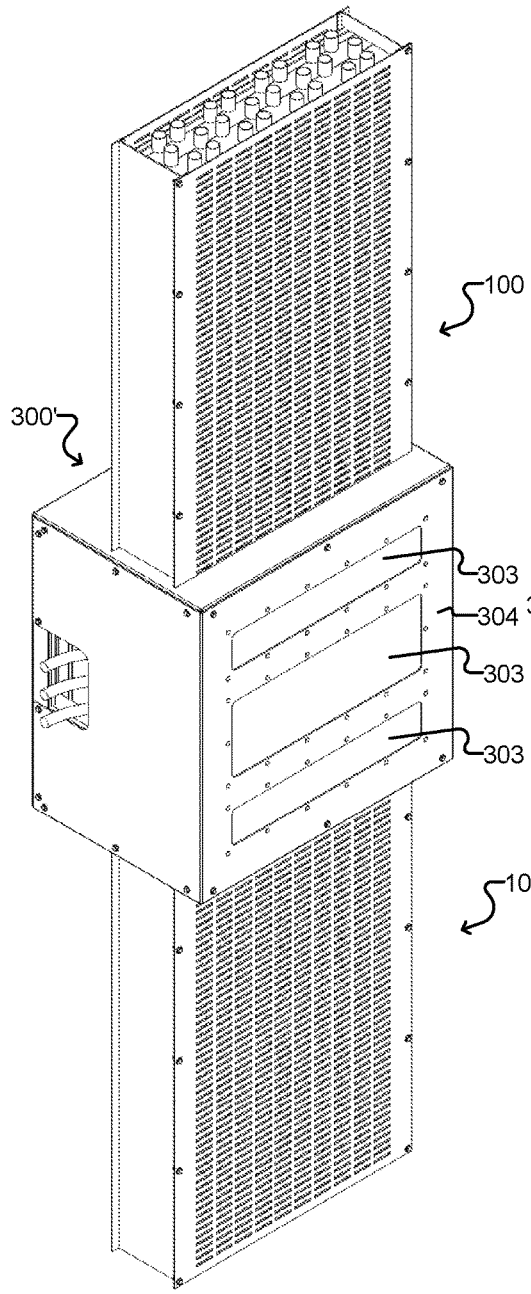
FIG. 7 shows a tap box according to another embodiment of the present disclosure connected between two bus sections.
Figure 7A:
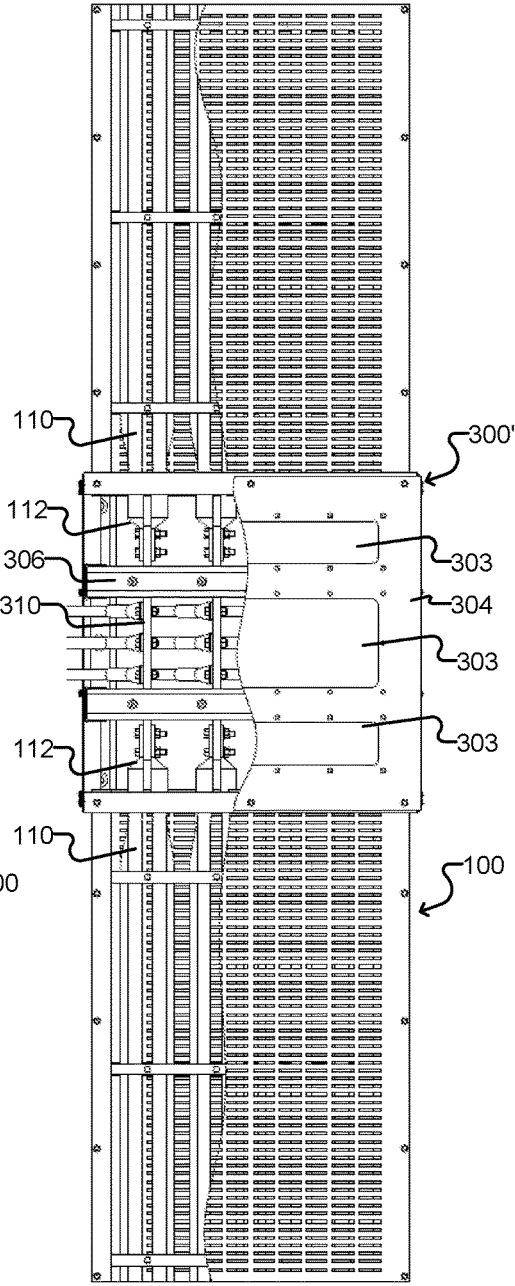
FIG. 7A shows the tap box and bus sections of FIG. 7 with portions of their covers cut away.

FIGS. 7 and 7A show a tap box 300' according to another embodiment. Tap box 300' has a plurality of infrared (IR) windows 303 in its cover 304. IR windows 303 facilitate inspection of the internal connections of the tap box 300' without removing cover 304 by allowing thermal imaging of the connections to the bus bars 310.

The present disclosure may be embodied in other specific forms without departing from its spirit or essential characteristics. The described embodiments are to be considered in all respects only as illustrative and not restrictive.

The invention claimed is:

1. An electrical power supply structure comprising:
   a plurality of insulated conductors, each insulated conductor extending longitudinally and configured to carry high amperage electrical power;
   a barrier support plate comprising one or more openings for receiving the plurality of insulated conductors, and a sealing system forming a water tight seal around the plurality of insulated conductors in the openings;
   a first support structure extending longitudinally from a first side of the barrier support plate, the first support structure connected to the barrier support plate by a first flexible joint;
   a second support structure extending longitudinally from a second side of the barrier support plate, the second support structure connected to the barrier support plate by a second flexible joint, each of the first and second support structures comprising a longitudinally extending enclosure having a plurality of transversely extending conductor support members for supporting the plurality of insulated conductors; and,
   a spacer block having an opening sized to fit an outer dimension of one of the first and second support structures and configured to be mounted between the barrier support plate and a floor of a building such that the barrier support plate is held at a predetermined height above the floor.

2. The electrical power supply structure of claim 1 wherein the plurality of insulated conductors are grouped by phase.

3. The electrical power supply structure of claim 2 wherein the insulated conductors in each group are arranged in a circular arrangement.

4. The electrical power supply structure of claim 2 comprising a shield plate between groups of insulated conductors of different phases.

5. The electrical power supply structure of claim 1 wherein the insulated conductors comprise pipes.

6. An electrical power distribution system for a high-rise building with a plurality of floors, the system comprising:
   a plurality of electrical power supply structures arranged in a vertical stack, each electrical power supply structure comprising:
      a plurality of insulated conductors, each insulated conductor extending longitudinally and configured to carry high amperage electrical power;
      a barrier support plate comprising one or more openings for receiving the plurality of insulated conductors, and a sealing system forming a water tight seal around the plurality of insulated conductors in the openings;
      a first support structure extending longitudinally from a first side of the barrier support plate, the first support structure connected to the barrier support plate by a first flexible joint; and
      a second support structure extending longitudinally from a second side of the barrier support plate, the second support structure connected to the barrier support plate by a second flexible joint, each of the first and second support structures comprising a longitudinally extending enclosure having a plurality of transversely extending conductor support members for supporting the plurality of insulated conductors; and, a plurality of tap boxes for connecting the plurality of electrical supply structures, each tap box connected between two adjacent electrical power supply structures and comprising a bus bar for each phase of electrical power, the bus bar having a first end for connecting to all of the plurality of insulated conductors carrying that phase of electrical power in an upper one of the two adjacent electrical power supply structures, and a second end for connecting to all of the plurality of insulated conductors carrying that phase of electrical power in a lower one of the two adjacent electrical power supply structures, wherein a length of each of the first and second support structures of each of the electrical power supply structures is selected such that each of the tap boxes is positioned at a predetermined height above one of the plurality of floors of the high-rise building.

7. The electrical power distribution system of claim 6 wherein the plurality of insulated conductors of each electrical power supply structure are grouped by phase.

8. The electrical power distribution system of claim 7 wherein the insulated conductors in each group are arranged in a circular arrangement.

9. The electrical power distribution system of claim 7 comprising a shield plate between groups of insulated conductors of different phases.

10. The electrical power distribution system of claim 6 wherein the plurality of insulated conductors of each electrical power supply structure comprise pipes.

* * * * *